United States Patent [19]
Eason

[11] Patent Number: 5,857,649
[45] Date of Patent: Jan. 12, 1999

[54] STABILIZING AND MEMORY MUSICAL INSTRUMENT STAND

[75] Inventor: Donald H. Eason, Fort Collins, Colo.

[73] Assignee: Ultimate Support Systems, Inc., Fort Collins, Colo.

[21] Appl. No.: 807,116

[22] Filed: Jan. 10, 1997

[51] Int. Cl.⁶ .................................................. F16M 11/32
[52] U.S. Cl. .......................................... 248/164; 248/166
[58] Field of Search .................................... 248/164, 166, 248/188.2; 108/118; 211/195; 984/257, 344, DIG. 1; 403/93; 16/321; 188/69, 82.77; D6/429

[56] References Cited

U.S. PATENT DOCUMENTS

| | | | |
|---|---|---|---|
| 137,960 | 4/1873 | Rearden . | |
| D. 260,589 | 9/1981 | O'Brien | D6/176 |
| D. 370,369 | 6/1996 | Nordstrom | D6/466 |
| 688,623 | 12/1901 | Forry . | |
| 748,387 | 12/1903 | Lilly . | |
| 3,338,539 | 8/1967 | Foster | 248/188.2 |
| 4,321,874 | 3/1982 | Cenna | 108/99 |
| 4,763,865 | 8/1988 | Danner | 248/164 |
| 4,917,341 | 4/1990 | Pirchio | 248/164 |
| 5,199,930 | 4/1993 | Weber | 482/17 |
| 5,301,910 | 4/1994 | Lang et al. | 248/166 |
| 5,358,204 | 10/1994 | Terada | 248/164 |
| 5,467,953 | 11/1995 | Malizia | 248/166 |

OTHER PUBLICATIONS

Konig and Meyer brochure for a non–memory element, non–cam musical stand.
Konig and Meyer 1993 catalog.

*Primary Examiner*—Ramon O. Ramirez
*Assistant Examiner*—Long Dinh Phan
*Attorney, Agent, or Firm*—Santangelo Law Offices, P.C.

[57] ABSTRACT

The present invention is for an improved stand (2) typically of the music variety. The improvements consist of a stabilizing cam (10) and a compact, centrally located, adjustable position memory element (16). The stabilizing cam (10) may be used in a variety of structures to micro adjust the level of the stand (2) to provide better support and stability. The adjustable position memory element (16) may be used on a variety of devices as well including an articulable support stand such that the support stand can be returned upon reuse to a preselected position from a plurality of preselected available positions.

29 Claims, 4 Drawing Sheets

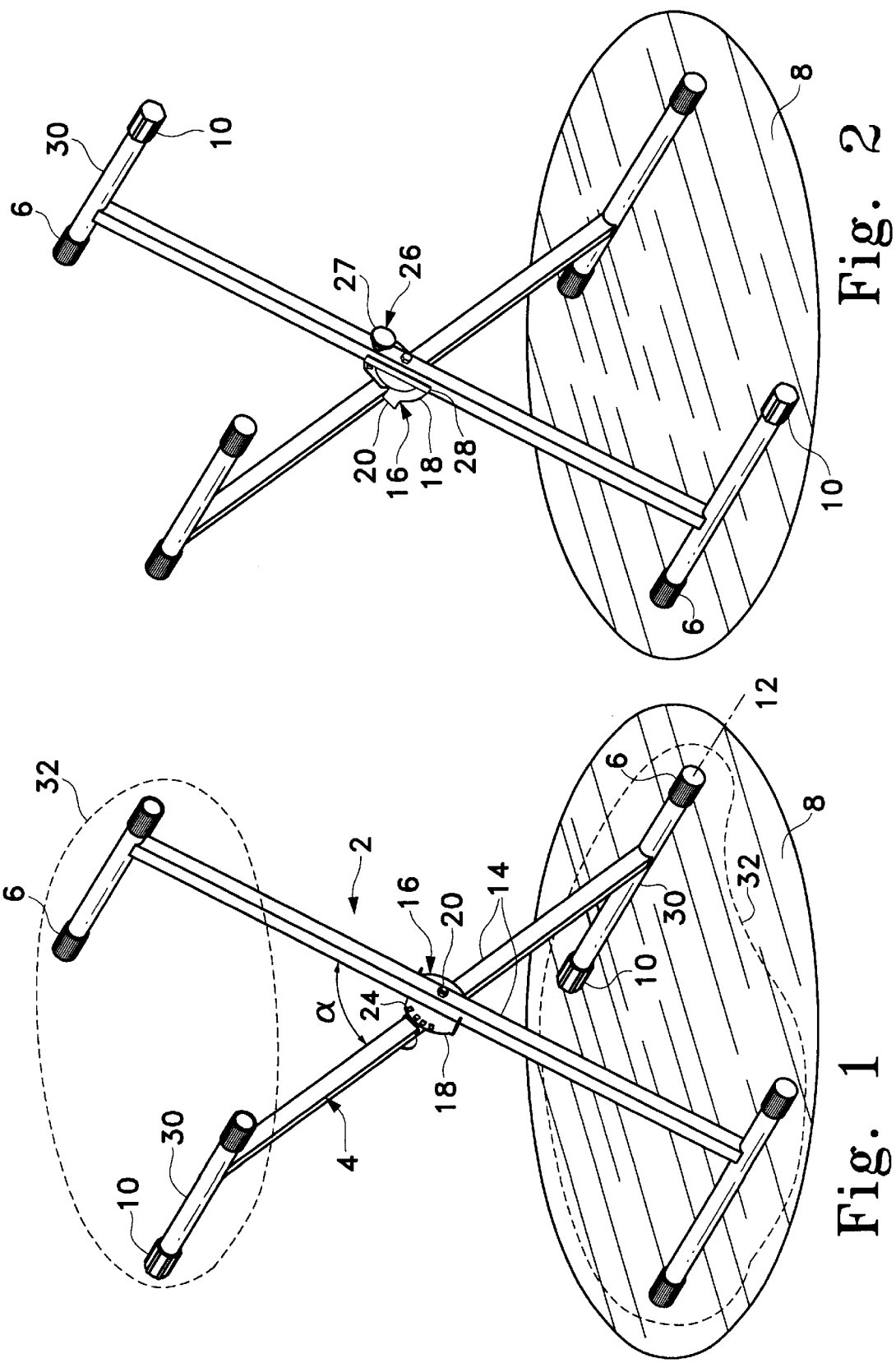

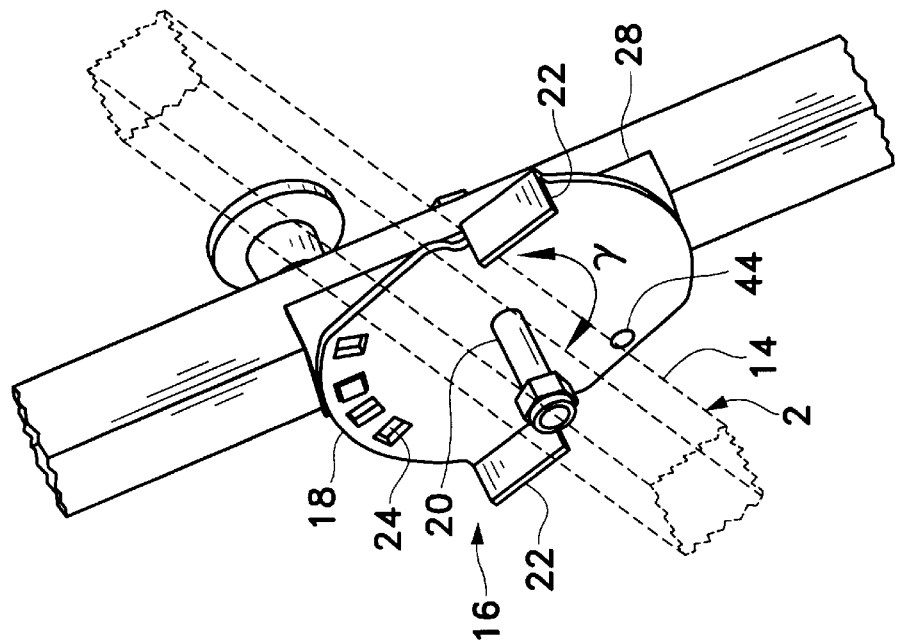
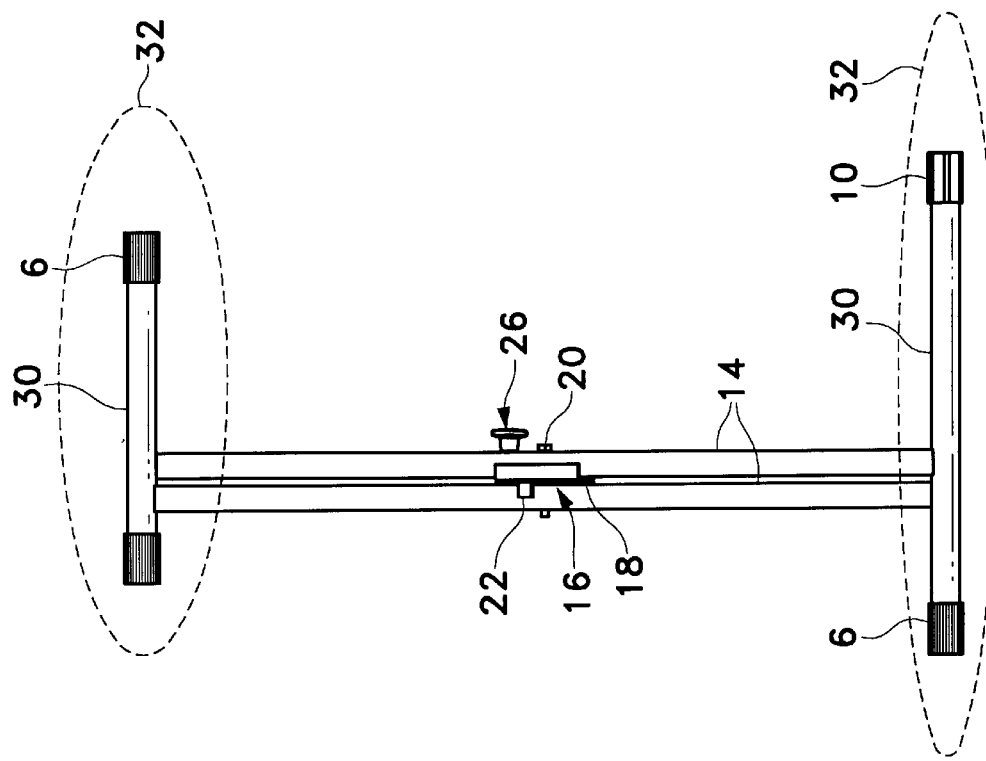

STABILIZING AND MEMORY MUSICAL INSTRUMENT STAND

This invention in general relates to the stands. Specifically, it relates to the field of musical instrument stands such as would hold instruments, keyboards, speakers, sheet music, and so forth.

I. BACKGROUND OF THE INVENTION

For centuries, people have desired suitable supports for different instruments. Thus, naturally, the field is crowded with various designs, improvements, and alternatives. It would seem quite incapable of further improvement. However, the present invention shows that not only are improvements possible, but they can be quite novel in specific areas. A primary goal of most stands is to adequately support the apparatus in a stable and efficient manner. Thus, in stands typical of this field, the stands may be foldable, and may be adjustable to different heights with varying degrees of ease and utility. However, it appears that no stand has approached this desirable feature in the manner that the present invention has uniquely solved the problem. For instance, U.S. Pat. No. 5,467,953 to Malizia shows a supporting stand for a musical instrument keyboard. It shows what is described as two double-T stand segments which are swivelable out of a rest position into a working position in the manner of a pair of scissors. To determine the swivel angle and accordingly the working height, a locking gear mechanism with a catch member is included near the pivot point of the two double-T stand segments. While this may add some convenience in providing a package for specific intervals of height, it appears to do no more than simply provide adjustable height, a feature long known to those skilled in the art. It still requires the user to select the height each time it is unfolded. Similarly, U.S. Pat. No. 5,538,204 to Terada, called a Folding Keyboard Stand is similarly situated. It appears to use cross arms which pivot about a central axis and may be held to an angular relationship by a stamped engagement disk with mating protrusions and indentions. Again, the Terada reference is a variation of the function of the Malizia reference in that the user is required each time the stand is unfolded to select the proper height at that point. The Danner reference, U.S. Pat. No. 4,763,865, is also called a Foldable Keyboard Stand. It is formed with elongated leg tubes pivotally connected together to form an X shape. Two of the support arms include a ring like collar that supports a generally flat keyboard laterally. Again, the Danner reference, like the Malizia and Terada references, include a mechanism to allow the user to select a particular height after the device is unfolded each time. The Lang reference, U.S. Pat. No. 5,301, 910, uses a chain at the ends of an "X"-shaped structure to adjust the height. It also appears to be such a lightweight design that the frame itself may bend to accommodate non-planar support surfaces. The Forry reference, U. S. Pat. No. 688,623, is not a music stand and appears to use two cross bars near the central pivot point held by a chain to hold the support at a desired elevation. It also shows variations of an X brace support which can be set at a certain height after it is unfolded. The Rearden reference, U.S. Pat. No. 137,960, also not a music stand, appears to offer a single elevation height.

In reviewing the art, it seems apparent that a gap is missing in the field of support stands. The gap is filled by the present invention. The gap that is missing includes, among other aspects, the ability of the user to easily and quickly stabilize the stand (without twisting or bending the frame) to adjust for irregular support surfaces. The gap also includes the ability of the user to efficiently preselect a certain height from a plurality of heights and open and close the support stand easily to the preselected height from an easily repeatable and centrally located position.

This area of improvement has gone unnoticed in spite of a long felt need and a long available arts and elements. What is surprising is the present invention fulfils the gap even though the field is crowded with a wide variety of devices and improvements. Certaly, those in the art appreciated that those issues existed and attempted to make more portable and useful stands, yet apparently failed to appreciate the particular solution of the present invention. With the field crowded, it may be apparent that those skilled in the art made substantial attempts to fill the need but were not successful in achieving what the present invention accomplishes.

II. SUMMARY OF THE INVENTION

The present invention shows a unique manner and device for adjusting the height of a stand to a preselected position. It also shows a unique way of providing micro adjustments of the elevation stability. The present invention typically uses a rotatable stabilizing cam or at least one of the contact surfaces to micro adjust the stability of the stand. Furthermore, it may use a centrally located memory plate to preselect a certain angular position of the stand in use. This memory plate generally is independently rotatable about a central pivot from the rotation of a typical articulating frame (which may occur about the same pivot), such as a cross frame. This preselected position may be retained such that when the stand is folded and is subsequently returned to an unfolded position, the stand returns to a preselected position without unnecessary actions, readjustments, or bulk.

Thus, an object of the present invention is to provide a support frame typically for music stands that includes at least three contact surfaces connected to the support frame and at least one stabilizing cam on at least one of the contact surfaces. A goal of this object is to provide a stabilizing cam that is adapted to rotate about an axis that is substantially parallel to a supporting surface upon which the stand is supported to allow rotational movement of the cam about the axis to change the level and therefore stability of the stand. Another goal is to provide a music stand that has four contact surfaces, such that three contact surfaces may provide a planer contact, and a stabilizing cam as a fourth contact surface to provide leveling stability. Another goal is to provide a support frame that articulates. This support frame may include a cross frame containing contact surfaces on each end of the cross frame. A further goal is to provide an adjustable position memory element to repeatably and automatically allow the adjustable position memory element to be returned to a preselected position. A further goal is to provide a torque distributor to distribute the torque forces induced by the stand in use or by memory element or other elements.

Naturally, further goals and objects and combinations thereof of the invention are disclosed throughout other areas of the specification and claims.

III. DESCRIPTION OF THE DRAWINGS

FIG. 1 shows a front view of the preferred embodiment.

FIG. 2 shows a back view of the preferred embodiment.

FIG. 5 shows a side view of the preferred embodiment

FIG. 6 shows a detail of the adjustable position memory element.

IV. DETAILED DESCRIPTION OF THE PREFERRED EMBODIMENT

Figure 4:
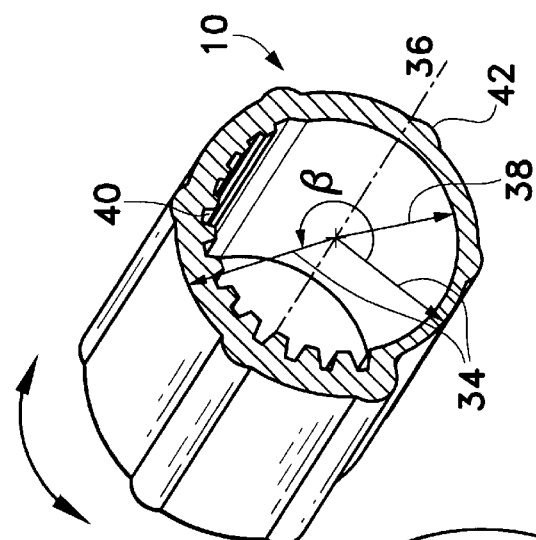
FIG. 4 shows a detail of the stabilizing cam removed from the support frame.

The basic concepts of the present invention may be implemented in a variety of ways. It involves the stand, the method of supporting the stand, different aspects of the stand such as stabilizing using a cam, locking the position in a preselected position, so that upon collapse and return to use, the stand may be efficiently repeatably and automatically returned to a given preselected position, distributing forces, and other related aspects. Various techniques related to the device and steps are inherent to the utilization. They may simply be the natural result of utilizing the device as intended and described. In addition, while some devices are disclosed, it would be understood that these not only accomplish certain methods, but can be varied in a number of ways. Importantly, as to all of the foregoing, all of these facets should be understood and encompassed by this patent.

Referring to FIGS. 1 and 2, the preferred embodiment of the stand (2) contains a support frame (4). It may be articulating and may generally be shaped as a cross frame, containing cross frame members (14). The cross frame members (14) may rotate about a pivot (20) where the cross frames intersect with a frame angle α between the members. Located about the pivot (20) may be an adjustable position memory element (16). This particular adjustable position memory element will be described in more detail later. At the ends (32) of the support stand (4) may be arms (30). In the preferred embodiment, each section of the cross frame may have one arm. Each arm may contain at least one contact surface (6). Considering the collective effects of both arms on each of the ends (32), the preferred embodiment would typically have at least three contact surfaces to establish a planer contact with a supporting surface (8).

In the preferred embodiment, four contact surfaces are shown. At least one of the contact surfaces may contain a stabilizing cam (10). The stabilizing cam may be positioned on an end of an arm (30). Its purpose is to allow micro adjustments, that is minor adjustments, to level or provide stability to the support frame (4), in compensating for irregularities in the supporting surface (8). As known from geometry, three points establish planer contact; yet, in many practical situations, a fourth point is useful for further support. However, because of irregularities in supporting surfaces, the fourth point may not coincide with the planer support formed by the other three points. Therefore, the stabilizing cam (10) allows micro adjustments to conform the fourth contact surface to support the arm (30) of the support frame (4) in a planer alignment with the other three contact surfaces. Obviously, more contact surfaces and more stabilizing cams can be provided to make similar adjustments. In the preferred embodiment, as shown in FIGS. 1 and 2, each end (32) of the support frame having the cross frame members (14) may contain a similar arrangement of arms and contact surfaces.

The present invention, in using the stabilizing cam (10), certainly is not restricted to the preferred embodiment. For instance, among many configurations, the invention could include a four legged table with a stabilizing cam (10) arranged at an angle to the supporting surface (8) so that by rotating the stabilizing cam, similar micro adjustments could occur.

Figure 3:
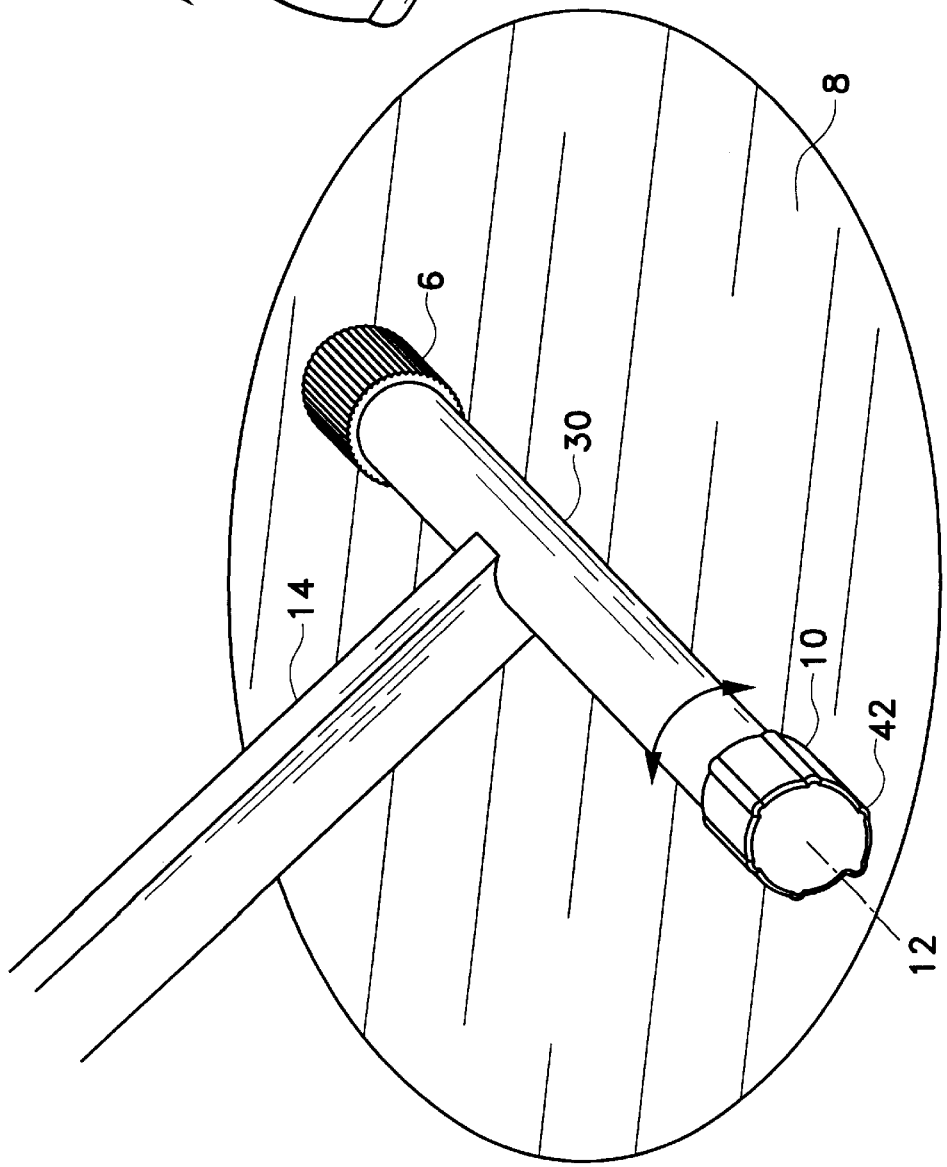
FIG. 3 shows a detail of the stabilizing cam connected to the frame.

Also, referring in more detail to FIG. 3, the stabilizing cam may be aligned or otherwise positioned along an axis (12) substantially parallel to the supporting surface. By "substantially parallel", it is meant to include an orientation that would allow the rotation of the stabilizing cam to effect a change in position and would exclude the typical leveling feet found in, for instance, many appliances that turn on an axis generally perpendicular to the supporting surface. This orientation may ease the ability to make the micro adjustments in that a simple rotation of the stabilizing cam (10) about the axis (12) parallel to the supporting surface (8) may provide the micro adjustments discussed above.

Referring to FIG. 4, the stabilizing cam itself is shown in more detail. The stabilizing cam (10) may tend to be a plastic or rubberized (although other materials may also be suitable) sleeve that slidably engages the arm (30), shown in FIGS. 1–3. The inside surface (38) of the stabilizing cam may be of a dimension that would engage the arm snugly, yet not so tightly that it may be difficult to turn or rotate. The outside surface (34) of the stabilizing cam may vary in distance ("outside surface distance") from the centerine (36) of the inside surface (38). In other words, the inside surface (38) may be concentric, whereas the outside surfaces (34) and their distances from the centerline (36) may change progressively or intermittently at a different arc angle β around the stabilizing cam (10). For convenience and increased rotatability, the stabilizing cam inside surface may contain release points (40) such that less area is engaged by the inside surface (38). This may aid in ease of rotation. Furthermore, these release points may improve the manufacturing, such as moldability or economic use of the particular material. A further aspect, as shown in FIG. 4, of the stabilizing is that the outside surface may contain positioning detents (42). These positioning detents may be useful in retaining the cam in that certain position as it contacts the supporting surface (8). They may also be useful in visually or tactilely rotating the cam to a certain position.

Obviously, other embodiments of the stabilizing cam (10) are possible. For instance, the stabilizing cam could contain hexagonal surfaces on the inside or outside or both surfaces. Each hexagonal face might vary in thickness, such that as the stabilizing cam were positioned to different hexagonal faces, the intents and purposes of the present invention as described above would be accomplished. Likewise, it could be rectangular, square, and other configurations. The important point is that it may be relocated to allow micro adjustments. This may generally be about an axis that is substantially parallel to the supporting surface. These adjustments could be allowed in a continuous fashion by a continuously changing outside surface distance or could be allowed in discrete increments. The positioning ridges (42) additionally could be marked or otherwise indicated to allow a user to easily reposition the stabilizing cam to a certain orientation, such as with numbers, colors, or other visual or tactile indications.

Referring to FIGS. 1–2 and 5–7, the present invention also may include the adjustable position memory element (16). This element may improve the overall usefulness of the present invention for the portability aspect. This feature typically would work in conjunction with an articulating support frame and may include a cross frame arrangement, as described above. Obviously, other arrangements are available. This aspect of the present invention allows the frame to be collapsed to a reduced volume and quickly and efficiently to be repositioned upon reuse to a preselected position. The preselected position may be lateral or vertical, and for the present purposes, generally, it may pertain to a vertical height position. An important feature of the present invention is that a variety of preselected positions may be available.

Figure 7:
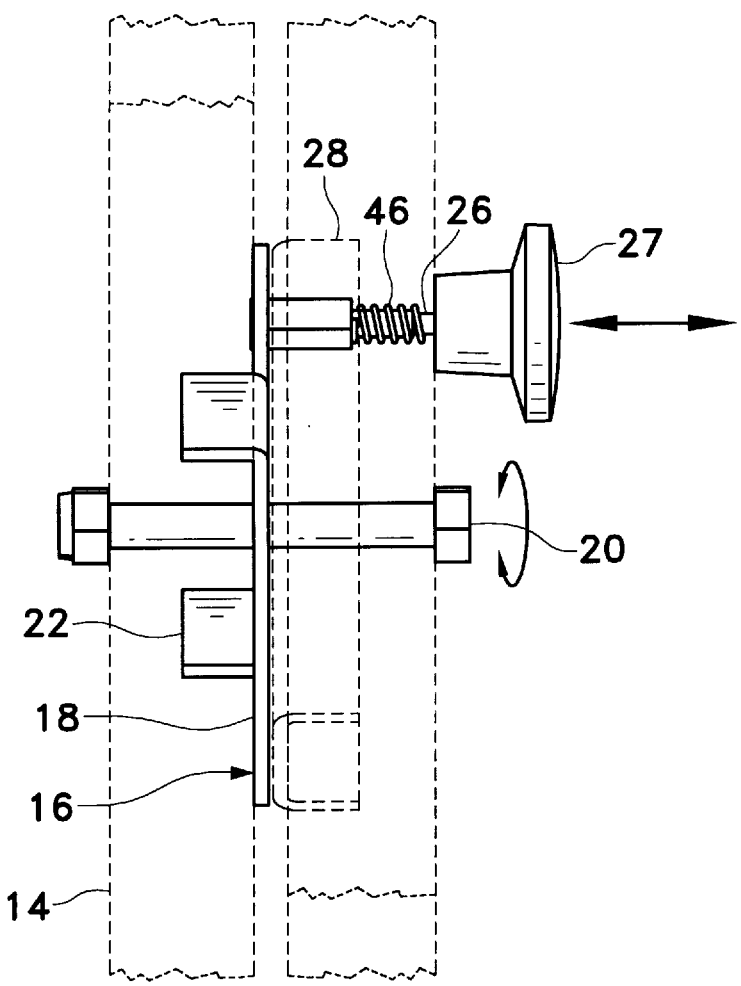
FIG. 7 shows a cross section of the FIG. 6 and the adjustable position memory element.

Referring specifically to FIGS. 6 and 7, the present invention may accomplish this aspect by providing a memory plate disposed in proximity to the support frame (4) about a pivot (20) of the support frame. An important feature for the preferred embodiment is that the memory plate (18) may be independently rotatable about pivot (20) through the plate angle γ compared to the articulation of the support frame (4) and the frame angle α, shown in FIG. 1. This aspect typically allows the preselected position to be retained each time the frame is folded and unfolded. The adjustable position memory element (16) may include at least one stop (22) (and in the preferred embodiment, two stops) to contact and restrain at least one of the cross frame members (14) when the support frame is unfolded. Additionally, the adjustable position memory element may include a plurality of engagement points (24) located in the proximity of the memory plate (18). In the preferred embodiment, the engagement points (24) may be square apertures formed in the memory plate itself Obviously, other configurations, holes, protrusions, and so forth could be used to accomplish the same goals and objects. Thus, a preselected position from a plurality of positions available may be determined, selected, and engaged. As shown, once the preselected position is determined and engaged, the stop (22) would naturally change its angular location as well by a corresponding plate angle γ difference. Thus, each time the stand (2) was reused, the support frame (4) may be opened such that it positively engages the stop (22) at an angle determined by the preselected position on the memory plate (18).

The preselected position may be engaged by an engagement element (26). The engagement element in the preferred embodiment may include a biasing element (46) (such as a spring) to assist in keeping the engagement element engaged with the engagement points (24) and may include a knob (27) for the convenience of the user. Furthermore, by positively engaging the engagement point (such as a hole or other aperture) with a engagement element (such as a pin), a more fixed relationship may be made. This perhaps has an additional advantage of less wear on the rotatable elements.

A typical method of using the stand with the adjustable position memory element could include selecting a relative position between the cross frame members by disengaging an engagement element attached to one of the cross frame members, if it was already engaged, rotating at least one of the cross frame members to a selected position, allowing the memory plate to rotate, or forcibly rotating it, independently of the cross frame member to the corresponding selected position, aligning the engagement element with a selected engagement point on the memory plate from a plurality of engagement points, and engaging the selected engagement point with the engagement element to position the stop. Then, typically after use, the method could include folding the support frame to a reduced volume state, and, typically sometime later, returning the support frame to the relative position independently of having to repeat adjustments by simply engaging the stop upon unfolding. The method could be augmented by the use of a frame detent to assist in selecting the position. By the term "allowing," the applicant realizes that normal friction forces and so forth may resist the movement somewhat.

Another aspect of the present invention is designed to strengthen the adjustable position memory element (16). Because the adjustable position memory element may be located about the pivot (20) on the support frame (4), various torsion forces may be created by the stop or stops by the adjustable position memory element (16) on the support frame. Therefore, a torque distributor (28) may be helpful in distributing these torque forces. Obviously, the torque forces could come from other elements, as well. For instance, if the device did not utilize the memory element described, but simply had a tab or other stop that engaged a frame member, then the torque distributor could be effective in distributing these torque forces. In the preferred embodiment, this may be done by providing a bent or C-shaped channel to engage the support frame (4) area where the stops (22) contact it. Obviously, the structure could be strengthened as a whole, or in that area, or in many other fashions.

Another feature for convenience of the user and as an improvement to the stand is to provide a frame detent (44). The frame detent is located so that as the support frame (4) engages the stop (22) and may assist in selecting an appropriate position. In normal use, the memory plate may rotate relative to a first frame member through a certain angle to an appropriate position which then may be engaged by the other frame member at a selected engagement point. Typically, as the stand is unfolded and an appropriate position is being selected, the frame detent may provide a light and somewhat easily overcome rotational constraint of the memory plate to the first frame member. Thus, as the first frame member is rotated, the memory plate may follow the first frame member to an appropriate relative position to the other frame member at which point a selection may be made. Such movement of the memory plate may still be considered independent for the purposes of this invention in that the memory plate may be capable of moving independently. The frame detent adds some convenience to the adjustment and selection procedure. The frame detent may also restrain the support frame from disengaging the stop. Thus, the frame detent (44) may be helpful to allow the stand (2) to remain in an unfolded position.

Each of these stand embodiments could include various facets of the present invention. Some may include the stabilizing cam, while others may not include such elements. Others may include varieties of the adjustable position memory element or any combination thereof. The marketplace and manufacturing concerns may dictate the appropriate embodiments for the present invention.

The foregoing discussion and the claims that follow describe only the preferred embodiment to the present invention. Particularly with respect to the claims, it should be understood that a number of changes may be made without departing from the essence of the present invention. For instance, many of the dependent claims could apply to other independent claims. In this regard, it is intended that such changes—to the extent that they substantially achieve the same results in substantially the same way—will still fall within the scope of the present invention. It is simply not practical to describe in the claims all the possible embodiments to the present invention which may be accomplished generally in keeping with the goals and objects of the present invention and this disclosure and which may include providing a support frame, adjusting the stability of the support frame, and providing a memory retaining element at preselected positions. To the extent the methods claim in the present invention are not further discussed, they are natural outgrowths of the system or apparatus claims. Therefore, separate and further discussion of the methods are deemed unnecessary, as they otherwise claim steps that are implicit in the use and manufacture of the system or the apparatus claims. Furthermore, the steps are organized in a more logical fashion, however, other sequences can and do occur. Therefore, the method claims should not be construed to include only the order of the sequence and steps presented.

Furthermore, any references mentioned in the application for this patent as well as all references listed and any information disclosure as originally filed with the application are hereby incorporated by reference in their entirety to the extent that they may be deemed essential to support the enablement of the invention(s). However, to the extent statements might be considered inconsistent with this/these invention(s), such statements are expressly not to be considered as made by the applicant(s).

I claim:

1. A music stand comprising:
   a. a music articulating support frame; and
   b. an adjustable position memory element connected to said support frame to repeatably allow said support frame to be returned to a preselected position and wherein said memory element comprises:
      i. a memory plate pivotally connected to said support frame;
      ii. at least one stop connected to said memory element;
      iii. a plurality of engagement points located in the proximity of said memory plate; and
      iv. an engagement element attached to said frame to engage at least one of said engagement points located in proximity of said memory plate in a preselected position and adapted to allow said engagement element to maintain said engagement point upon closing said support frame and to allow said support frame to return to said preselected position upon reuse.

2. The music stand as described in claim 1 wherein said memory plate is independently pivotal of said articulating support frame.

3. The music stand as described in claim 1 further comprising a torque distributor to distribute torque forces from said memory element.

4. The music stand as described in claim 1 wherein said articulating support frame comprises a cross frame having at least two cross frame members wherein said cross frame members collectively comprises at least three contact surfaces.

5. The music stand as described in claim 1 wherein said engagement points comprises apertures through said memory plate and said engagement element comprises a pin and wherein said pin engages at least one of said apertures to allow for less wear on said memory element.

6. The music stand as described in claim 4 wherein said support frame comprises at least one stabilizing cam.

7. A music stand as described in claim 1 wherein said support frame comprises at least one stabilizing cam.

8. A music stand as described in claim 7 wherein said stabilizing cam is adapted to rotate about an axis substantially parallel to said supporting surface.

9. A music stand as described in claim 1 wherein said support frame comprises at least four contact surfaces connected to said support frame and wherein at least one of said contact surfaces comprises a stabilizing cam.

10. A music stand as described in claim 7 wherein said stabilizing cam comprises a continuously varying outer surface distance.

11. A music stand as described in claim 1 wherein said stabilizing cam comprises a discretely varying outer surface distance.

12. A music stand as described in claim 7 wherein said stabilizing cam comprises at least one positioning detent.

13. A music stand as described in claim 12 wherein said positioning detent comprises at least one visual position indicator.

14. The music stand as described in claim 12 wherein said positioning detent comprises at least one tactile position indicator.

15. The music stand as described in claim 7 wherein said stabilizing cam comprises a molded structure.

16. A method for returning a stand to a preselected position, said stand having a support frame comprising at least a first and second cross frame member pivotally attached to each other and a memory plate pivotally attached to said first cross frame member and having a stop oriented toward said second cross frame member, comprising the steps of:
   c. utilizing said support frame;
   d. selecting a relative position between said cross frame members comprising the steps of:
      i. rotating at least one cross frame member to a selected position;
      ii. allowing said memory plate to rotate independently of said step of rotating said cross frame member to said selected position;
      iii. aligning said engagement element with a selected engagement point on said memory plate from a plurality of engagement points on said memory plate; and
      iv. engaging said selected engagement point with said engagement element to position said stop;
   e. folding said support frame to a reduced volume state while maintaining said engagement with said selected engagement point; and
   f. returning said support frame to said relative position by engaging said stop with said support frame.

17. The method for returning a stand to a preselected position as described in claim 16 further comprising the step of utilizing a frame detent to assist in said step of selecting said relative position.

18. The method for returning a stand to a preselected position as described in claim 16 further comprising the steps of positively stopping said support frame at said preselected position and the step of distributing torque forces created by said step of positively stopping said support frame at said preselected position.

19. The method for returning a stand to a preselected position as described in claim 16 further comprising the step of supporting said support frame on a supporting surface with at least three contact surfaces to establish at least minimal planar contact.

20. The method for returning a stand to a preselected position as described in claim 16 further comprising the step of adjusting a stability of said support frame with at least one stabilizing cam.

21. The method for returning a stand to a preselected position as described in claim 20 wherein said step of adjusting said stability of said support frame with at least one stabilizing cam further comprises the step of rotating said stabilizing cam about an axis substantially parallel to said supporting surface.

22. The method for returning a stand to a preselected position as described in claim 16 further comprising the step of adjusting a stability of said support frame with at least one stabilizing cam attached to at least one of said contact surfaces.

23. The method for returning a stand to a preselected position as described in claim 16 further comprising the step of supporting said support frame on a supporting surface with at least four contact surfaces and wherein one of said contact surfaces comprises a stabilizing cam.

24. The method for returning a stand to a preselected position as described in claim 20 further comprising the step of continuously varying an outer surface distance of said stabilizing cam.

25. The method for returning a stand to a preselected position as described in claim 20 further comprising the step of discretely varying an outer surface distance of said stabilizing cam.

26. The method for returning a stand to a preselected position as described in claim 20 further comprising the step of stabilizing said rotation of said cam wherein at least one positioning detent.

27. The method for returning a stand to a preselected position as described in claim 26 further comprising the step of visually indicating a rotated position of said positioning detent.

28. The method for returning a stand to a preselected position as described in claim 26 further comprising the step of tactilely indicating a rotated position of said positioning detent.

29. The method for returning a stand to a preselected position as described in claim 20 further comprising the step of molding at least a portion of said stabilizing cam.

\* \* \* \* \*